United States Patent
Toussaint et al.

(10) Patent No.: US 9,293,757 B2
(45) Date of Patent: Mar. 22, 2016

(54) METAL-AIR ACCUMULATOR WITH AIR ELECTRODE PROTECTION DEVICE

(75) Inventors: Gwenaelle Toussaint, Nemours (FR);
Philippe Stevens, Noisy Rudignon (FR);
Bernard Toussaint, Tonnoy (FR)

(73) Assignee: ELECTRICITE DE FRANCE, Paris (FR)

( * ) Notice: Subject to any disclaimer, the term of this patent is extended or adjusted under 35 U.S.C. 154(b) by 189 days.

(21) Appl. No.: 14/117,527

(22) PCT Filed: May 15, 2012

(86) PCT No.: PCT/FR2012/051080
§ 371 (c)(1),
(2), (4) Date: Nov. 13, 2013

(87) PCT Pub. No.: WO2012/156639
PCT Pub. Date: Nov. 22, 2012

(65) Prior Publication Data
US 2014/0191727 A1    Jul. 10, 2014

(30) Foreign Application Priority Data

May 19, 2011    (FR) ..................................... 11 54356

(51) Int. Cl.
| | |
|---|---|
| *H02J 7/00* | (2006.01) |
| *H01M 2/34* | (2006.01) |
| *H01M 10/42* | (2006.01) |
| *H01M 10/44* | (2006.01) |

(Continued)

(52) U.S. Cl.
CPC .............. *H01M 2/34* (2013.01); *H01M 10/425* (2013.01); *H01M 10/44* (2013.01); *H01M 10/48* (2013.01); *H01M 12/08* (2013.01); *H02J 7/0068* (2013.01)

(58) Field of Classification Search
CPC ..... H01M 2/34; H01M 10/425; H01M 10/44; H01M 10/48; H01M 12/08; H02J 7/0068
USPC ......................................................... 320/134
See application file for complete search history.

(56) References Cited

U.S. PATENT DOCUMENTS

| | | | |
|---|---|---|---|
| 3,532,548 A | | 10/1970 | Stachurski |
| 3,819,413 A | * | 6/1974 | Nippe et al. .................. 429/217 |
| 5,306,579 A | | 4/1994 | Shepard, Jr. et al. |

(Continued)

FOREIGN PATENT DOCUMENTS

WO           00/36677           6/2000

OTHER PUBLICATIONS

Kim et al., "Relationship between carbon corrosion and positive electrode potential in a proton-exchange membrane fuel cell during start/stop operation," J. Power Sources, 192:674-678 (2009).

(Continued)

*Primary Examiner* — Vuthe Siek
(74) *Attorney, Agent, or Firm* — McAndrews, Held & Malloy Ltd.; Nabeela Rasheed

(57) ABSTRACT

The present invention relates to a rechargeable accumulator comprising one or more metal-air cells, each cell comprising a metallic negative electrode, a first positive electrode for releasing oxygen, a second positive electrode which is a porous air electrode containing at least one oxygen reducing catalyst, and an automatic device for protecting the air electrode during the charging and discharging phases of the accumulator. The invention also relates to a method for storing and releasing electrical energy using such an accumulator.

11 Claims, 1 Drawing Sheet

Figure 1:
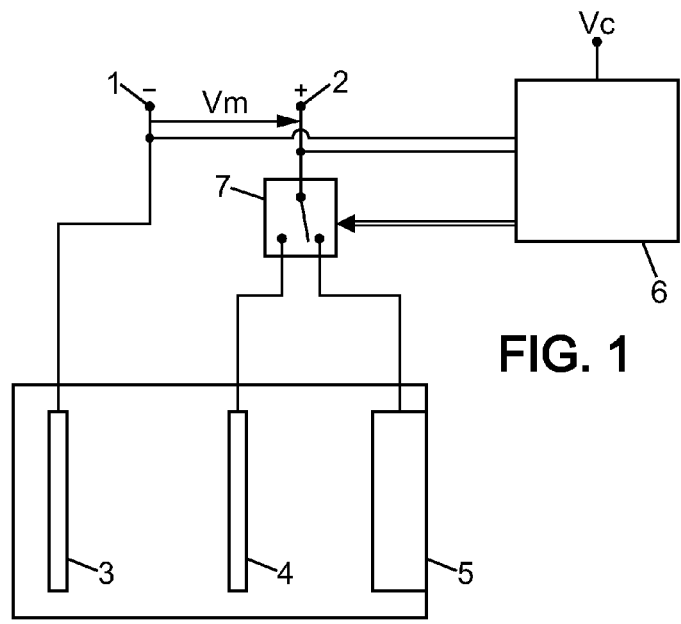

(51) Int. Cl.
*H01M 10/48* (2006.01)
*H01M 12/08* (2006.01)

(56) References Cited

U.S. PATENT DOCUMENTS 5,480,741 A 1/1996 Sakai et al.
2011/0070506 A1 3/2011 Friesen et al.

OTHER PUBLICATIONS

Neburchilov et al., "A review on air cathodes for zinc-air fuel cells," J. Power Sources, 195:1271-1291 (2010).
Kinoshita, "Carbons," in the Handbook of Battery Materials (director of publication J.O. Besenhard), Wiley-VCH Verlag GmbH, Weinheim, Germany (2007).

\* cited by examiner

METAL-AIR ACCUMULATOR WITH AIR ELECTRODE PROTECTION DEVICE

The present application is filed pursuant to 35 U.S.C. 371 as a U.S. National Phase application of International Patent Application No. PCT/FR2012/051080, which was filed May 15, 2012, claiming the benefit of priority to French Patent Application No. 1154356, which was filed on May 19, 2011. The entire text of the aforementioned applications is incorporated herein by reference in its entirety.

The present invention relates to a rechargeable metal-air accumulator comprising an air electrode, an oxygen-releasing electrode and an automatic device for protecting the air electrode during the charging and discharging phases of the accumulator. The invention also relates to a method for storing and releasing electrical energy using such an accumulator.

Metal-air batteries use a metal-based negative electrode, the metal being such as zinc, iron or lithium, coupled to an air electrode. When discharging such a battery, molecular oxygen is reduced at the positive electrode and the metal is oxidized at the negative electrode:

$$O_2 + 2H_2O + 4e^- \rightarrow 4OH^-$$

$$M \rightarrow M^{n+} + ne^-$$

Both electrodes most commonly contact an alkaline aqueous electrolyte.

Zinc-air batteries are marketed for use in auditory prostheses for example.

Many studies have been carried out for several decades to develop and optimize air electrodes, that enable the production of metal-air electrochemical generators, which are known for their high energy density that can reach several hundreds of Wh/kg.

Air electrodes have the advantage of being able to use oxygen from the air as the oxidizing agent of the electrochemical reduction, air being available in unlimited quantities anywhere and at any time. A large reaction surface area is however necessary, because the density of oxygen in air is low (0.03 mol/L). The porous solid structure of air electrodes provides this large reaction surface area. An air electrode is a porous solid structure that contacts the liquid electrolyte, generally an alkaline aqueous solution. The interface between the air electrode and the liquid electrolyte is a so-called "triple contact" interface where the active material of the electrode, the gaseous oxidizing agent and the liquid electrolyte are simultaneously present.

The reader may refer for example to the article by V. Neburchilov et al. "*A review on air cathodes for zinc-air fuel cells*", Journal of Power Sources 195 (2010), pages 1271-1291 for a description of the various types of air electrodes that can be used in zinc-air accumulators.

However, air electrodes have a considerable drawback, which is their great fragility when they are used when recharging the accumulator. Specifically, the air electrode has a porous structure and operates as a volumetric electrode in which the electrochemical reaction takes place in the whole volume of the electrode, at the interface between the gaseous oxidizing agent, the liquid electrolyte and the solid active material (triple contact). In the charging phase, gaseous molecular oxygen is formed within the structure of the air electrode. This gaseous oxygen rapidly results in mechanical destruction of the porous structure of the air electrode by breaking the bonds between the grains of carbon and the used binding polymer.

Moreover, the corrosion of the carbon in the presence of oxygen via carbon oxidation is also accelerated at high potentials (see the article by Kim J., Lee J. Tak Y., "*Relationship between carbon corrosion and positive electrode potential in a proton-exchange membrane fuel-cell during start/stop operation*" (2009), Journal of Power Sources, 192 (2), pages 674-678, and the chapter "Carbons" by Kinishita, K. (2007), in the Handbook of Battery Materials (ed. J. O. Besenhard), Wiley-VCH Verlag GmbH, Weinheim, Germany).

The inventors have also observed that oxygen reduction catalysts incorporated in the air electrode, at the surface of the carbon grains, are not stable at the high potentials necessary for the reverse oxidation reaction. Some authors have used more resistant oxygen reduction catalysts, coupled to an oxygen-releasing catalyst in a bi-functional electrode composed of two electrically-coupled layers (see U.S. Pat. No. 5,306,579). However, this configuration produces electrodes having a short lifetime and a limited number of cycles.

Another known solution to this problem of deterioration of the air electrode during the recharging phase of the accumulator is the use of an oxygen-releasing electrode, i.e. a second positive electrode that does not undergo deterioration due to the formation of molecular oxygen.

U.S. Pat. No. 3,532,548 describes such a rechargeable accumulator comprising a negative electrode, an air electrode and an oxygen-releasing electrode (called the auxiliary electrode). When charging the accumulator described in this document, only the negative electrode and the oxygen-releasing electrode (auxiliary electrode) are connected. When discharging the accumulator two operating modes are used:
- a first "normal" operating mode where only the air electrode operates with the negative electrode, and
- a second "high power" operating mode where the two positive electrodes (air electrode and auxiliary electrode) operate jointly.

The Applicant has nonetheless observed that the system as described in U.S. Pat. No. 3,532,548 does not allow for effective protection of the air electrode. Specifically, when, at the start of the discharge, the voltage between the two accumulator terminals is too high, the air electrode may undergo electrochemical deterioration.

According to the Applicant's knowledge this deterioration at the start of the discharge had not been detected until now and in any case is not taken into consideration in document U.S. Pat. No. 3,532,548.

The aim of the present invention is to ensure effective protection of the porous air electrode of a metal-air accumulator not only during the charging phase of the accumulator, but also during discharging.

This aim is achieved in the present invention by virtue of an automatic protection system that constantly monitors the potential between the two accumulator terminals, particularly at the start of the discharge, and only connects the air electrode when this potential is low enough to remove any risk of mechanical or chemical deterioration of the air electrode.

One subject of the present invention is therefore a rechargeable accumulator comprising one or more metal-air cells, each cell comprising
- a first terminal and a second terminal,
- a metal negative electrode for a metal-air cell, connected to the first terminal,
- a first positive oxygen-releasing electrode,
- a second positive electrode, which is a porous air electrode containing at least one oxygen reduction catalyst, and
- an electrolyte,
- control means adapted to continuously compare the measured voltage ($V_m$) between the second terminal and the first terminal to a setpoint value ($V_c$) and to send a switch signal to switching means when the measured voltage ($V_m$) falls below the setpoint voltage ($V_c$), the switching means being adapted to receive a switch signal originating from the control means and to connect and disconnect the air electrode from the second terminal.

The accumulator of the present invention therefore comprises, in each of its cells, three types of electrode:

- a negative electrode permanently connected to the first terminal, i.e. during the charging phase and the discharging phase,
- a first positive electrode that, in one embodiment, is continuously connected to the second terminal or that, in another embodiment, is connected to the second terminal in alternation with the second positive electrode, i.e. it is disconnected from the second terminal when the second positive electrode is being connected, and
- an air electrode (second positive electrode) that must be protected from any deterioration and that is connected to the second terminal only during the second discharging phase when the potential between both terminals is low enough.

The present invention also encompasses variants where one or more of these electrodes are present in a plurality of copies or in a plurality of parts. Mention may be made, by way of example, of a cell with a single negative plate-shaped electrode, two air electrodes situated on either side of the negative electrode, and two metal positive electrodes (oxygen-releasing electrodes) situated between the plate-shaped negative electrode and both air electrodes.

The negative electrode may in principle be any metal electrode widely used in metal-air cells. It may for example be an iron, lithium or zinc electrode, preferably a lithium electrode (Li/LiOH) or a zinc electrode (Zn/Zn(OH)$_4^{2-}$), and more preferably a zinc electrode.

The first positive oxygen-releasing electrode may, for example, be a silver electrode (Ag/AgO) or a nickel electrode (Ni/NiO or NiOH/NiOOH). In the electrochemical cell, this electrode, preferably a nickel electrode, typically has a grid structure or a perforated plate structure, and it is generally situated between the negative electrode and the air electrode. The perforated structure of this electrode serves, as it is known, to ensure the free passage of the constituents of the liquid electrolyte between the negative electrode and the air electrode during discharging.

The second positive electrode is a porous air electrode designed to allow triple contact between the electrolyte, the gaseous oxidizing agent and the solid active material of the electrode. It may be chosen in principle from among all those usually used in the art, and especially from those described in the article by Neburchilov mentioned above.

This is preferably an electrode obtained by aggregation of a carbon powder composed of carbon grains with a high surface area, such as the product Vulcan® XC72 marketed by Cabot. The specific surface area of the carbon may be increased by reaction with a gas such as $CO_2$, prior to its incorporation into the air electrode. The high specific surface area of the carbon grains is critical. Indeed, the higher it is, the higher the current density per unit of geometrical surface area of the electrode. The porous electrode is manufactured by aggregating the carbon grains using a binder which is preferably a hydrophobic fluoropolymer such as FEP marketed by Dupont. The application WO 2000/036677, for example, gives a detailed description of an air electrode for a metal-air accumulator.

Furthermore, the carbon particle-based air electrode, preferably contains at least one oxygen reducing catalyst. This oxygen reducing catalyst is preferably chosen from the group formed by manganese oxide and cobalt oxide. These catalysts, although very effective, are however deactivated when they are subjected to overly high potentials and the automatic protection device of the present invention, formed by the combination of a control means and a switching means, described in more detail below, is therefore particularly important when these oxygen reducing catalysts are used.

The electrolyte used is preferably an alkaline aqueous electrolyte contacting all the electrodes in the cell. In certain embodiments, for example in the case where a lithium electrode is used as negative electrode, it may be necessary to separate physically, as is known, the aqueous electrolyte from the negative electrode with a lithium ion conducting solid electrolyte.

The control means used in the present invention must be adapted to compare continuously the measured voltage (Vm) between the second terminal and the first terminal to a setpoint value (Vc). This setpoint value is for example the value of a reference voltage provided by a stabilized voltage source, powered by the battery or by an external battery. It is preferably set to a value slightly lower than the open circuit cell voltage in the charged state when only the air electrode is connected, i.e. about 1.44 V for a zinc-air battery and 3 V for a lithium-air battery.

Preferably, an electromechanical relay driven by an operational amplifier will be used as a control means. Such an operational amplifier is marketed for example by National Semiconductor under the reference LM324, and will be described in more detail with reference to FIG. 2.

Another subject of the present invention is a method for storing and releasing electrical energy using an accumulator such as described above.

This method comprises the following successive steps:

(a) a charging phase during which the negative electrode is connected to the first terminal, the first positive electrode is connected to the second terminal and the air electrode is disconnected, (b) a first discharging phase during which the negative electrode is connected to the first terminal, the first positive electrode is connected to the second terminal, the air electrode is disconnected, and the control means continuously compare the measured voltage ($V_m$) between both terminals to a setpoint value ($V_c$), (c) a first switching step during which the second positive electrode, which is the air electrode, is connected to the second terminal when the value of the voltage between both terminals falls below the setpoint value ($V_c$), (d) a second discharging phase during which the negative electrode is connected to the first terminal and the air electrode is connected to the second terminal, and (e) a second switching step during which the air electrode is disconnected from the second terminal.

The Applicant considers that the succession of steps (b) and (c), i.e. the non-connection of the air electrode at the start of the discharge, the continuous monitoring of the decrease in the voltage between both terminals by an appropriate control means, then the connection of the air electrode only when the absolute value of the potential difference between the terminals has become sufficiently low, effectively protects the air electrode and constitutes the contribution of the present invention to the state of the art.

In other words, at the start of the discharge, as long as the absolute value of the voltage between both terminals is higher than that of the setpoint value (for example $V_c$=1.44 V), the air electrode remains disconnected and does not run the risk of being deteriorated by an overly high potential difference.

In the case where a first positive electrode based on nickel (Ni/NiO) is used, the voltage at the start of charging is typically equal to 1.7 V.

When the value of the voltage between both terminals, measured continuously by the control means, falls below the setpoint value (1.44 V), the control device sends a switch signal to the switching means with the aim of finally connecting the air electrode to the second terminal.

The air electrode may remain connected until the end of the discharging step, i.e. until the start of the next charging phase. The disconnection (step (e)) of the air electrode before the next charging step (step (a)) may be achieved manually or, preferably, automatically through control means associated with the switching means carrying out the first switching step (step (c)) of the method according to the invention.

In the second discharging phase, during which the air electrode is connected to the second terminal, the first positive electrode may be connected or disconnected. Whether the first positive electrode is connected or disconnected of course depends on the structure of the switching means. In one embodiment of the present invention, the switching means is adapted to disconnect the first positive electrode of the second terminal. In another embodiment, the switching means is adapted to not disconnect the first positive electrode from the second terminal, which therefore remains continuously connected to the second terminal, both during charging and discharging.

Figure 2:
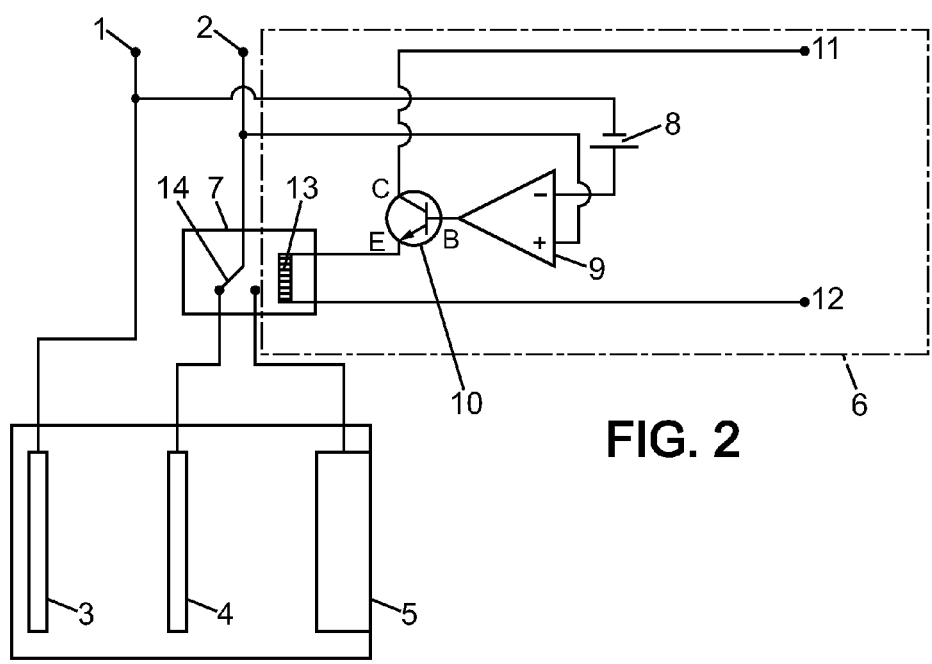

The invention will now be described in detail, with reference to the appended figures in which FIG. 1 is a schematic diagram of one embodiment of a cell of an accumulator of the present invention, and FIG. 2 is a schematic diagram of a control means and of a switching means, forming the device for protecting the air electrode of the present invention.

The cell of the accumulator comprises a first terminal 1 and a second terminal 2. During discharge of the accumulator, the first terminal is a negative terminal and the second terminal is a positive terminal.

The first terminal 1 is connected to a first metal electrode 3, the so-called negative electrode, made of zinc or lithium for example.

The second terminal 2 is coupled, via a switching means 7, to an oxygen-releasing electrode 4 or to an air electrode 5. During discharge of the accumulator, these two electrodes form positive electrodes.

The oxygen-releasing electrode may for example be made of nickel. The air electrode is a carbon-based porous electrode containing an oxygen reducing catalyst at the solid/gas interface. The catalyst may be manganese oxide or cobalt oxide.

The three electrodes 3, 4, 5 contact at least one electrolyte, preferably an alkaline aqueous electrolyte.

The two positive electrodes 4, 5 are coupled to the second terminal 2 through switching means 7. In the embodiment shown in FIG. 1 the switching means 7 are exclusive, i.e. they connect terminal 2 either to the oxygen-releasing electrode 4 or to the air electrode 5.

The accumulator according to the invention further comprises control means 6, adapted to measure continuously the voltage $V_m$ between both terminals 1 and 2 and to send a switch signal to the switching means 7 and thereby control the connection or disconnection of one and/or the other positive electrode.

The control means are shown in more detail in FIG. 2.

A reference voltage, equal to the setpoint voltage ($V_c$), is supplied by a stabilized voltage source 8 connected between the first terminal 1 and a negative input of an operational amplifier 9. The second terminal 2 is connected to a positive input of the operational amplifier 9, which measures a voltage difference between both inputs. Thus, the setpoint voltage is subtracted from the voltage between the first terminal and the second terminal. When the voltage measured between both terminals is equal to the setpoint voltage, the difference measured by the operational amplifier between the voltages applied to both inputs is equal to zero.

In addition, the control means 6 comprise a transistor 10 acting as a switch in a current loop between two terminals 11 and 12.

When the voltage $V_m$ between both terminals 1 and 2 of the accumulator is higher than the setpoint voltage $V_c$, the operational amplifier sends a given voltage to the base B of the transistor 10. The transistor 10 then turns on and allows a current to pass between its emitter E and its collector C.

In addition, the control means comprise a coil, or an inductor, 13. When current flows in the current loop, the coil generates a magnetic field.

For example the switching means 7 may comprise a relay containing a conductive element 14 that can be moved by a magnetic field.

Thus, when the coil 13 generates a magnetic field, the conductive element 14 is moved from a first position to a second position. In the first position, the conductive element is separated from the air electrode so as to disconnect it from the second terminal of the accumulator, and in the second position the air electrode is connected to the second terminal of the accumulator.

The invention claimed is:

1. A rechargeable accumulator comprising one or more metal-air cells, each cell comprising
   a first terminal and a second terminal,
   a metal negative electrode for a metal-air cell, connected to the first terminal
   a first positive oxygen-releasing electrode,
   a second positive electrode, which is a porous air electrode containing at least one oxygen reducing catalyst, and
   an electrolyte,
   a control circuit adapted to continuously compare a measured voltage between the second terminal and the first terminal to a setpoint value and to send a switch signal to switching means when the measured voltage falls below the setpoint value,
   a commutator adapted to receive a switch signal originating from the control and to connect and disconnect the air electrode from the second terminal.

2. The accumulator of claim 1, wherein the negative electrode is a lithium electrode (Li/LiOH) or a zinc electrode ($Zn/Zn(OH)_4^{2-}$).

3. The accumulator of claim 1 or claim 2, wherein the first positive oxygen-releasing electrode is a silver electrode (Ag/AgO) or a nickel electrode (Ni/NiO or NiOH/NiOOH).

4. The accumulator of claim 1, wherein the air electrode comprises carbon particles and on at least one oxygen reducing catalyst.

5. The accumulator of claim 1, wherein the oxygen reducing catalyst in the air electrode is chosen from the group formed by manganese oxide and cobalt oxide.

6. The accumulator of claim 1, wherein the setpoint value is set to a value lower than the open circuit voltage of the cell in the charged state when only the air electrode is connected.

7. The accumulator of claim 1, wherein the control is an electromechanical relay driven by an operational amplifier.

8. The accumulator of claim 1, wherein the first positive electrode takes the form of a grid or of a perforated plate and lies between the negative electrode and the air electrode.

9. A method for storing and releasing electrical energy using an accumulator as claimed in any one of the preceding claims, said method comprising the following successive steps:
- (a) a charging phase during which the negative electrode is connected to the first terminal, the first positive electrode connected to the second terminal and the air electrode is disconnected,
- (b) a first discharging phase during which the negative electrode is connected to the first terminal, the first positive electrode is connected to the second terminal, the air electrode is disconnected, and the control continuously compares the measured voltage between the terminal and the first terminal to a setpoint value,
- (c) a first switching step during which the second positive electrode, which is the air electrode, is connected to the second terminal when the value of the voltage between the second terminal and the first terminal falls below the setpoint value,
- (d) a second discharging phase during which the negative electrode is connected to the first terminal, and the air electrode is connected to the second terminal, and
- (e) a second switching step during which the air electrode (5) is disconnected from the second terminal.

10. The method of claim 9, wherein the first switching step, the commutator disconnects the first positive electrode from the second terminal.

11. The method of claim 9, wherein the first switching step, the commutator does not disconnect the first positive electrode from the second terminal.

* * * * *